Figure 1:
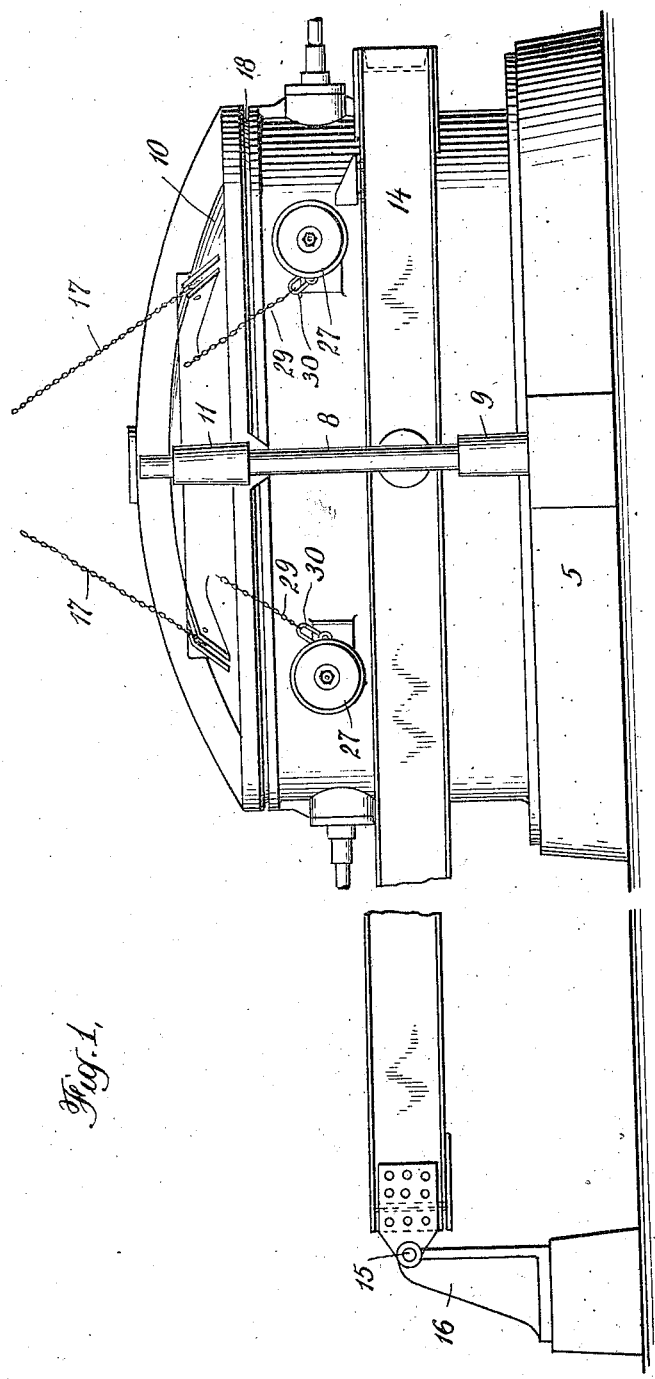

June 24, 1924.

F. J. METZGER

CONVERTER

Filed Aug. 4, 1923

1,498,636

2 Sheets-Sheet 1

INVENTOR
Floyd J Metzger
BY
ATTORNEYS

June 24, 1924.
F. J. METZGER
CONVERTER
Filed Aug. 4, 1923
1,498,636
2 Sheets-Sheet 2
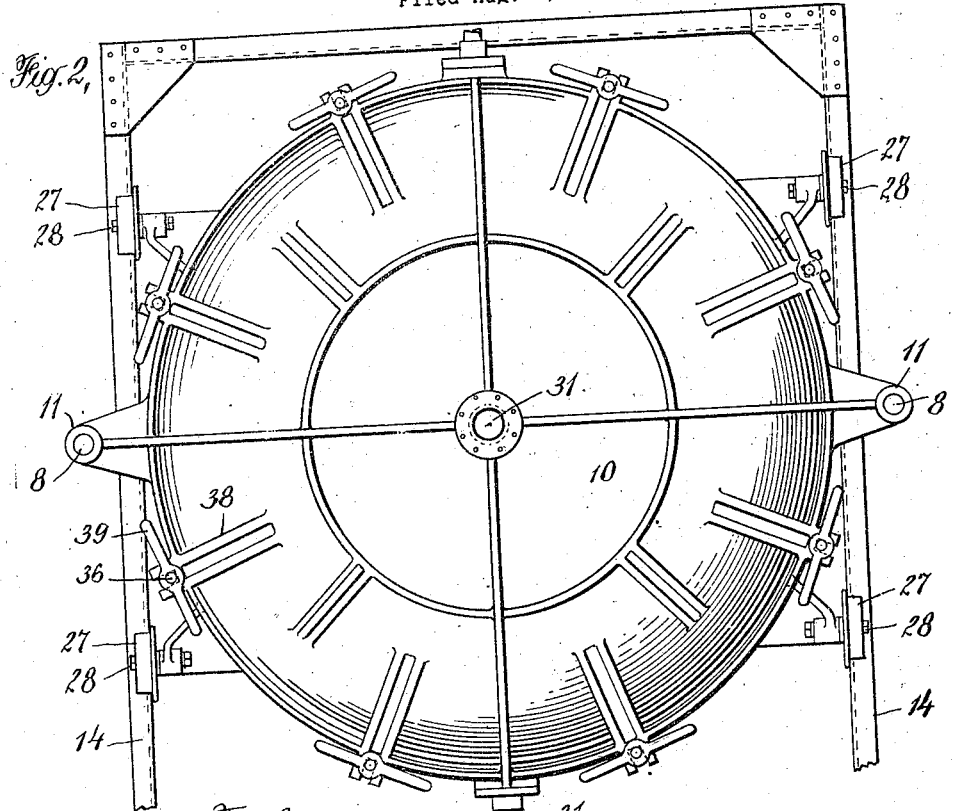
Fig. 2,
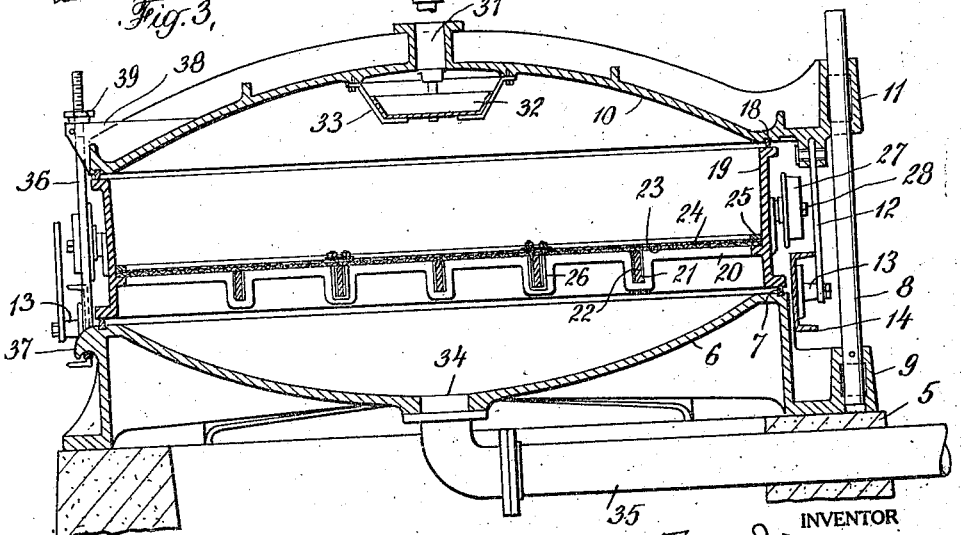
Fig. 3,
INVENTOR
Floyd J. Metzger
BY
Pennie Davis Marvin & Edmonds
his ATTORNEYS Patented June 24, 1924.

1,498,636

UNITED STATES PATENT OFFICE.

FLOYD J. METZGER, OF NEW YORK, N. Y., ASSIGNOR TO CALIFORNIA CYANIDE COMPANY, INCORPORATED, OF NEW YORK, N. Y., A CORPORATION OF DELAWARE.

CONVERTER.

Application filed August 4, 1923. Serial No. 655,644.

*To all whom it may concern:*

Be it known that I, FLOYD J. METZGER, a citizen of the United States, residing at New York city, in the county of New York, State of New York, have invented certain new and useful Improvements in Converters; and I do hereby declare the following to be a full, clear, and exact description of the invention, such as will enable others skilled in the art to which it appertains to make and use the same.

This invention relates to converters wherein solid products may be subjected to the action of a suitable gaseous medium to facilitate the separation of desirable products. The invention is particularly adapted for, although not limited to, use in the separation of hydrocyanic acid from cyanide material, for example, a furnace product obtained by the heating of a mixture of carbon and an alkali metal carbonate or oxide with or without a catalyzer, such as iron, in the presence of nitrogenous gas. Such a furnace product will contain from twenty per cent to thirty per cent of cyanide, and by passing carbon dioxide therethrough under certain conditions regulated to prevent polymerization of the hydrocyanic acid the latter may be obtained in a gaseous state and afterwards condensed. Other cyanide material than the furnace product mentioned may be similarly treated in the apparatus hereinafter described.

It is the object of the present invention to provide a simple and relatively inexpensive apparatus whereby the handling and treatment of the solid material may be facilitated and made most effective, and particularly to permit the introduction and withdrawal of the solid material with a minimum expenditure of effort.

Further objects and advantages of the invention will be apparent as it is better understood by reference to the following specification and accompanying drawing, in which—

Fig. 1 is a side elevation of the apparatus;
Fig. 2 is a plan view thereof; and
Fig. 3 is a transverse section illustrating the interior construction thereof.

In carrying out the invention it is desirable to pass the gaseous medium through the solid material rapidly and to withdraw the products of the reaction at a sufficient speed to prevent polymerization, for example, in the production of hydrocyanic acid. For this purpose, according to the present invention, the solid material is disposed in a tray or car having a foraminous bottom of sufficient strength to support the solid material. Access of air must be prevented during the reaction to avoid losses and particularly in the production of hydrocyanic acid to prevent escape of vapors thereof. Provision is made for the introduction of the gaseous medium at one side of the tray or car and for the withdrawal of the products of the reaction from the other side thereof. To avoid excessive handling of the solid material the tray or car should be removable from the apparatus so that it may be withdrawn therefrom and delivered by a suitable conveyer to the point where the spent solid material is stored. The charging of the apparatus is likewise facilitated as the fresh solid material may be placed therein after the tray or car has been dumped and before its return to the apparatus. By providing a number of trays or cars some of the latter may be filled with fresh material while the reaction is proceeding in the apparatus, and as soon as a tray or car of spent material is withdrawn another may replace it so that the apparatus is maintained in substantially continuous operation.

Referring to the drawing the apparatus is mounted on a suitable base 5. The bottom 6 is preferably circular in form and is provided at its periphery with a suitable gasket 7 to effect an air-tight joint. A pair of standards 8 are supported in brackets 9 on opposite sides of the bottom 6 and provide guides for the top or cover 10 which is circular in form and provided with lugs 11 having openings through which the standards 8 extend. Depending from the cover 10 are bolts 12 which are pivotally connected at their lower ends with brackets 13 on tracks 14, the latter being pivoted at their outer ends at 15 on supports 16 so that they swing up and down as the cover 10 is raised or lowered. Chains 17 are connected to the cover 10 and to suitable means (not shown) whereby the cover may be raised and lowered on the standards 8. The cover 10 is provided at its periphery with a gasket 18 corresponding to the gasket 7.

A tray or car 19 is adapted to be disposed between the bottom 6 and cover 10 and consists of an annular ring with an inwardlydirected flange 20. The flange is recessed at intervals as indicated at 21 to receive transverse supports 22 for the foraminous bottom. The latter consists of a layer 23 of heavy wire screen (No. 2 mesh being suitable for the purpose) and an overlying layer of wire cloth 24 (16 mesh being suitable for the purpose). The screen and cloth are held in position by an annular ring 25 and by U-bolts 26 extending therethrough and embracing the transverse supports 22. At its opposite sides the tray or car is provided with two pairs of wheels 27 mounted on axles 28, the wheels being adapted to cooperate with the track 14 when the latter is raised into engagement therewith. Chains 29 are connected by yokes 30 to the tray or car 19, these chains being adapted to permit lifting of the car by means of a traveling crane not shown.

The gaseous medium is introduced through an inlet 31 at the top of the cover 10 and passes thence through a distributor 32 supported by brackets 33 from the top. After passing through the layer of solid material in the tray or car the gaseous medium with the products of reaction escape through an outlet 34 in the bottom 6 and are thence conveyed through a pipe 35 to the condensing apparatus or gas-holder as may be desired. During the operation the cover is held tightly in position by bolts 36 which engage lugs 37 on the bottom 6 and corresponding lugs 38 on the cover 10. Wing nuts 39 permit tightening of the bolts.

In the operation of the apparatus the cover 10 is lifted to release the tray or car, the track 14 being at the same time moved upwardly into engagement with the wheels 27. As soon as the tray or car has been lifted by the track 14 to disengage the gasket 7 it may be moved from the apparatus along the track and thence lifted by the traveling crane and conveyed to the point where the contents are dumped. The tray or car is then refilled with fresh material and returned to the track. As soon as it has engaged the track it is moved beneath the cover 10 which is then lowered until an air-tight joint is again effected by the gaskets 7 and 18. The cover is clamped in position and the supply of gaseous medium is permitted to enter the apparatus and to proceed through the layer of solid material to accomplish the desired reaction, the reaction products being withdrawn as indicated through the pipe 35.

The operation of the apparatus is comparatively simple and the material may be handled in a rapid and effective manner. By providing a number of trays or cars which are filled with fresh material while the apparatus is in operation the procedure may be made substantially continuous and therefore highly efficient.

Various changes may be made in the details of the apparatus as illustrated and described without departing from the invention or sacrificing any of the advantages thereof.

I claim:—

1. In an apparatus of the character described, the combination of separable upper and lower sections, a tray or car adapted to be securely held therebetween with its peripheral edge cooperating with the corresponding edges of the upper and lower sections to form therewith a substantially air-tight chamber, a foraminous bottom in the tray or car to support solid material, means for introducing a gaseous medium to and for withdrawing it from the chamber and means for successively separating the upper section from the tray or car and for lifting the latter from the lower section.

2. In an apparatus of the character described, the combination of separable upper and lower sections, a tray or car adapted to be securely held therebetween and to form therewith a substantially air-tight chamber, a foraminous bottom in the tray or car to support solid material, means for introducing a gaseous medium to and for withdrawing it from the chamber, a track and means on the tray or car to cooperate with the track whereby withdrawal of the former is permitted when the sections are separated.

3. In an apparatus of the character described, the combination of separable upper and lower sections, a tray or car adapted to be securely held therebetween and to form therewith a substantially air-tight chamber, a foraminous bottom in the tray or car to support solid material, means for introducing a gaseous medium to and for withdrawing it from the chamber, a track, means on the tray or car to cooperate with the track whereby withdrawal of the former is permitted when the sections are separated, and means for tilting the track to lift the tray or car from the lower section.

4. In an apparatus of the character described, the combination of separable upper and lower sections, a tray or car adapted to be securely held therebetween and to form therewith a substantially air-tight chamber, a foraminous bottom in the tray or car to support solid material, means for introducing a gaseous medium to and for withdrawing it from the chamber, a track, means on the tray or car to cooperate with the track whereby withdrawal of the former is permitted when the sections are separated, and means connected to the upper section for tilting the track to lift the tray or car from the lower section.

5. In an apparatus of the character described, the combination of separable upper and lower sections, a tray or car adapted to be securely held therebetween and to form therewith a substantially air-tight chamber, means for introducing a gaseous medium to and for withdrawing it from the chamber, a foraminous bottom in the tray or car to support solid material, a pivoted track, connections between the upper section and the track whereby they are moved in unison and wheels on the tray or car to cooperate with the track when the upper section and track are lifted.

In testimony whereof I affix my signature.

FLOYD J. METZGER.